United States Patent
Fan et al.

(10) Patent No.: US 11,769,526 B1
(45) Date of Patent: Sep. 26, 2023

(54) SPIN TORQUE ASSISTED MAGNETIC RECORDING MEDIA

(71) Applicant: Seagate Technology LLC, Fremont, CA (US)

(72) Inventors: Yichun Fan, Eden Prairie, MN (US); Javier Ignacio Guzman, Minneapolis, MN (US); Ali Ghoreyshi, Minneapolis, MN (US); Wei-Heng Hsu, Fremont, CA (US); Pin-Wei Huang, Fremont, CA (US)

(73) Assignee: SEAGATE TECHNOLOGY LLC, Fremont, CA (US)

( * ) Notice: Subject to any disclaimer, the term of this patent is extended or adjusted under 35 U.S.C. 154(b) by 0 days.

(21) Appl. No.: 17/820,188

(22) Filed: Aug. 16, 2022

Related U.S. Application Data

(60) Provisional application No. 63/354,117, filed on Jun. 21, 2022.

(51) Int. Cl.
*G11B 5/733* (2006.01)
*G11B 5/00* (2006.01)

(52) U.S. Cl.
CPC ...... *G11B 5/733* (2013.01); *G11B 2005/0021* (2013.01)

(58) Field of Classification Search
None
See application file for complete search history.

(56) References Cited

U.S. PATENT DOCUMENTS

| | | | | |
|---|---|---|---|---|
| 6,118,622 | A * | 9/2000 | Gill | B82Y 10/00 |
| 6,178,073 | B1 * | 1/2001 | Hayashi | G11B 5/3903 |
| 6,194,896 | B1 * | 2/2001 | Takahashi | B82Y 40/00 |
| | | | | 324/252 |
| 6,295,175 | B1 * | 9/2001 | Tomita | G11B 5/3967 |
| 8,750,013 | B1 | 6/2014 | Abraham et al. | |
| 9,792,930 | B1 * | 10/2017 | Shimizu | G11B 5/1278 |
| 2009/0027812 | A1 * | 1/2009 | Noguchi | G11B 5/70 |
| | | | | 360/324.11 |
| 2009/0231748 | A1 * | 9/2009 | Noma | G11B 5/59688 |
| | | | | 427/127 |

(Continued)

OTHER PUBLICATIONS

Bello, et al., "Shaping and Storing Magnetic Data Using Pulsed Plasmonic Nanoheating and Spin-Transfer Torque", ACS Photonics, vol. 6, 2009, 1524-1532.

*Primary Examiner* — Peter Vincent Agustin

(74) *Attorney, Agent, or Firm* — HOLZER PATEL DRENNAN

(57) ABSTRACT

Magnetic recording media with a thermal spin injection layer that induces a spin injection in a magnetic recording layer in response to a thermal gradient in the thermal spin injection layer. The thermal spin injection layer may comprise an antiferromagnetic, a ferromagnetic, or a ferrimagnetic material that demonstrates a Spin Seebeck effect. In turn, when heating the magnetic recording media (e.g., with a near field transducer of a HAMR drive), the thermal gradient may be established in the thermal spin injection layer. A resulting spin torque field may assist in switching a magnetic domain in the magnetic recording layer by providing an assistive field to at least initiate switching of the magnetic domain. In turn, more reliable or efficient operation of a storage drive comprising the magnetic recording media may be realized.

18 Claims, 12 Drawing Sheets

(56) References Cited

U.S. PATENT DOCUMENTS

| | | | |
|---|---|---|---|
| 2012/0001281 A1* | 1/2012 | Yamane | G11C 11/161 |
| | | | 257/E29.323 |
| 2015/0380022 A1* | 12/2015 | Koui | G11B 5/3133 |
| | | | 360/99.08 |
| 2016/0180867 A1* | 6/2016 | Takagishi | G11B 5/09 |
| | | | 360/123.01 |
| 2016/0322091 A1 | 11/2016 | Parkin et al. | |
| 2018/0053521 A1* | 2/2018 | Yamane | H10N 50/10 |
| 2018/0090194 A1 | 3/2018 | Silva et al. | |
| 2020/0176022 A1 | 6/2020 | Li et al. | |

\* cited by examiner

SPIN TORQUE ASSISTED MAGNETIC RECORDING MEDIA

CROSS REFERENCE TO RELATED APPLICATIONS

The present application claims benefit of priority to U.S. Provisional Patent Application No. 63/354,117 entitled "SPIN TORQUE ASSISTED MAGNETIC RECORDING MEDIA" filed on 21 Jun. 2022, which is specifically incorporated by reference herein for all that it discloses or teaches.

BACKGROUND

The need for increased storage drive capacity has driven higher bit density in data storage drives (e.g., magnetic storage drives) so that more data may be recorded for a given area of recording media. Increases in areal density generally result in a reduction in the size of the media dedicated to storage of a given bit of data. When reducing the size of the media for storage of a given bit, the media may become thermally unstable unless the energy required to change the magnetic orientation of the given bit is also increased.

In view of these characteristics, approaches to data storage drives in which the magnetic recording media is heated prior to writing data have been proposed. An example of such technology includes heat assisted magnetic recording (HAMR) drives. In a HAMR drive, the magnetic media has a relatively high coercivity to maintain stability of the data stored in the drive. In turn, by heating a portion of the magnetic media to be written, the coercivity of the magnetic media in the area to be written may be lowered, data may be written to this area, and the area may be allowed to cool, thus preserving the written data in stable magnetic media. However, with increased coercivity, it may be more difficult to initiate a switch in the magnetic media such that writing data to the magnetic media may be more difficult and/or require increased resources to accomplish.

SUMMARY

The present disclosure generally describes a magnetic recording medium, which may include a magnetic recording layer for storage of data bits in magnetic domains of the magnetic recording layer and a thermal spin injection layer disposed adjacent to the magnetic recording layer. The thermal spin injection layer may include at least one of an antiferromagnetic or ferrimagnetic material. A thermal gradient in the thermal spin injection layer may induce a spin injection in the magnetic domains of the magnetic recording layer.

The present disclosure also generally describes a storage device, which may include a writer pole that is operative to induce a write head magnetic field; a near field transducer; and magnetic media. The magnetic media may include a magnetic recording layer for storage of data bits in magnetic domains of the magnetic recording layer, and a thermal spin injection layer may extend relative to the magnetic recording layer. The magnetic recording layer may be disposed between the thermal spin injection layer and the writer pole. The near field transducer may be operative to heat the magnetic media to create a thermal gradient in the thermal spin injection layer that induces a spin injection in the magnetic domains of the magnetic recording layer.

The present disclosure also generally describes a method of storage of data in a magnetic recording medium. The method may include heating a magnetic recording media including a magnetic recording layer; applying a writer field to the magnetic recording layer from a writer; creating a thermal gradient in a thermal spin injection layer adjacent to the magnetic recording layer in response to the heating; and inducing a spin injection in the magnetic recording layer in response to the thermal gradient created in the thermal spin injection layer. The spin injection may result in a spin torque field to assist in switching a magnetic orientation of the magnetic domain of the magnetic recording layer.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Other implementations are also described and recited herein.

DETAILED DESCRIPTION

Figure 1:
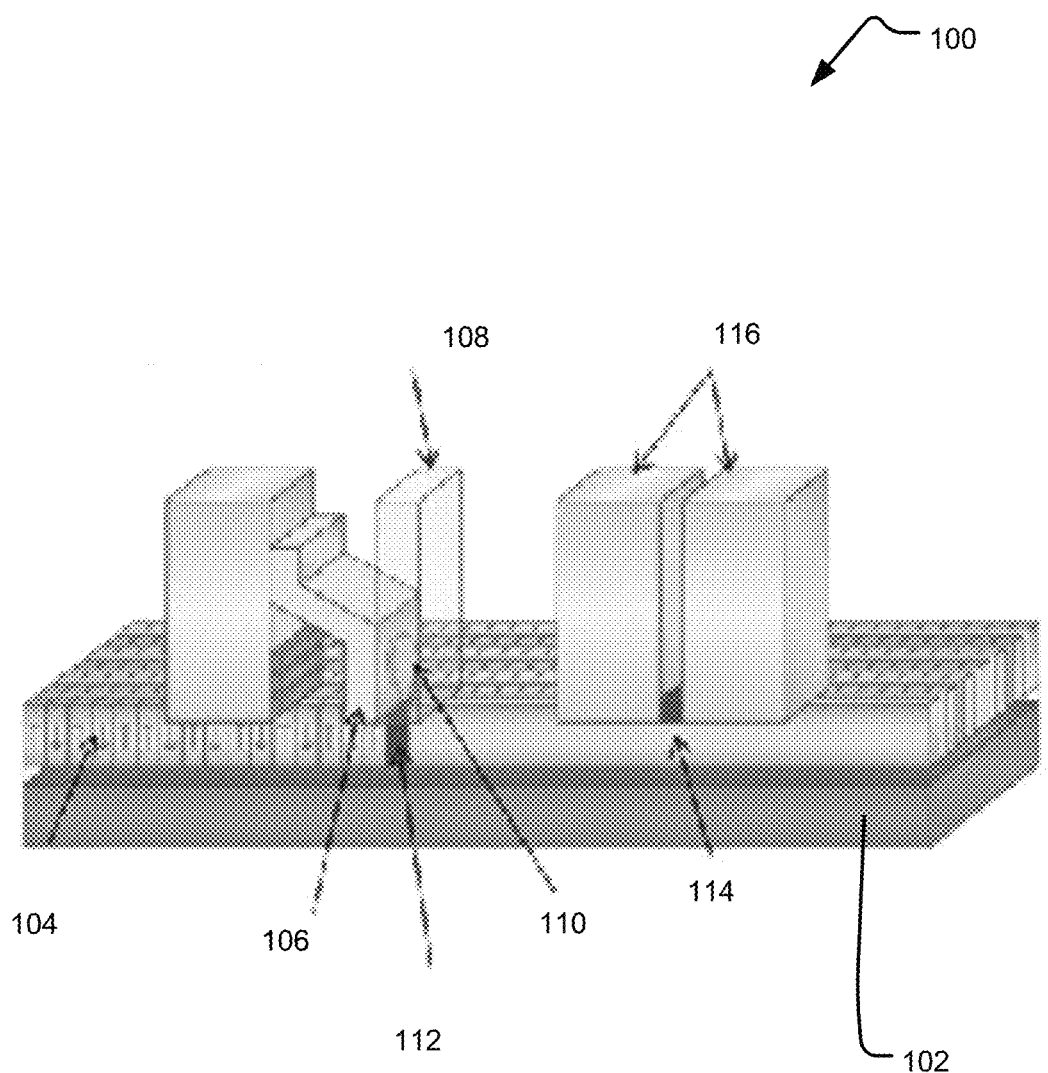
FIG. 1 illustrates an example storage device.

While the invention is susceptible to various modifications and alternative forms, specific embodiments thereof have been shown by way of example in the drawings and are herein described in detail. It should be understood, however, that it is not intended to limit the invention to the particular form disclosed, but rather, the invention is to cover all modifications, equivalents, and alternatives falling within the scope of the invention as defined by the claims.

The present disclosure generally relates to a data storage drive that has a magnetic recording medium and a thermal spin injection layer located relative to the magnetic recording layer. Specifically, a thermal gradient may be created in the thermal spin injection layer that results in a spin injection in the magnetic recording layer. The spin injection from the thermal spin injection layer may influence the magnetic recording layer to assist in writing data to the magnetic recording layer. Such an arrangement may be particularly useful in HAMR drives in which the magnetic recording media is heated, thus inducing a thermal gradient that may be used to generate the thermally induced spin injection.

With reference to FIG. 1, an example storage device 100 is depicted. The storage device 100 includes magnetic recording media 102. The magnetic recording media 102 may be provided according to any of the descriptions of magnetic recording media provided below. The magnetic recording media 102 may include magnetic domains 104 that may each be used to store a given bit of data. As depicted in FIG. 1, the magnetic domains 104 may include a perpendicular orientation relative to the major extent of the magnetic recording media (e.g., the major extent may correspond to a radial dimension of a magnetic recording disk). In this regard, an orientation of the magnetic poles of the magnetic domains 104 may be controlled in a direction perpendicular to the major extent of the magnetic recording media 102 to store the bits of data. This orientation is commonly referred to as perpendicular magnetic recording (PMR). In other examples, the magnetic recording media may be configured for longitudinal magnetic recording, in which the orientation of the magnetic poles of the magnetic domains 104 may be controlled in a direction parallel to the major extent of the magnetic recording media 102, which is often referred to as longitudinal magnetic recording (LMR). In still further examples, the magnetic recording media 102 may employ shingled magnetic recording (SMR) or other magnetic recording techniques without limitation.

The storage device 100 may include a writer pole 106. The writer pole 106 may be oriented to generate a magnetic field that may influence the magnetic domains 104 of the magnetic recording media 102. For instance, writer coils may be provided to generate a magnetic field that may be directed by the writer pole 106 into the magnetic recording media 102 to influence the orientation of the magnetic pole of one or more of the magnetic domains 104. In addition, the storage device 100 may include an optical wave guide 108 that may direct a beam of a laser to be incident on a near field transducer 110. In turn, by activating the laser, the energy of the laser may be guided by the optical wave guide 108 to the near field transducer 110 such that the near field transducer 110 heats the magnetic recording media 102 in a highly localized area (e.g., a given one or a given few of the magnetic domains 104). The storage device 100 may also include a reader 114, which may include reader shields 116. The reader 114 may be used to read the data bits from the magnetic domains 104.

Accordingly, the storage device 100 may be a HAMR drive that utilizes the near field transducer 110 to heat the magnetic recording media 102 prior to writing data into the magnetic domains 104. While not shown in detail in FIG. 1, the magnetic recording media 102 may include a layered structure. As may be appreciated, the near field transducer 110 may heat the magnetic recording media 102 such that the surface of the magnetic recording media 102 adjacent to the near field transducer 110 is generally heated to a higher temperature than layers located more remote from the near field transducer 110. The operation of the near field transducer 110 may create a heated portion 112 of the magnetic recording media 102 that may include one or more magnetic domains 104. In turn, a temperature gradient may be induced in the magnetic recording media 102 as a result of the operation of the near field transducer 110.

Figure 2:
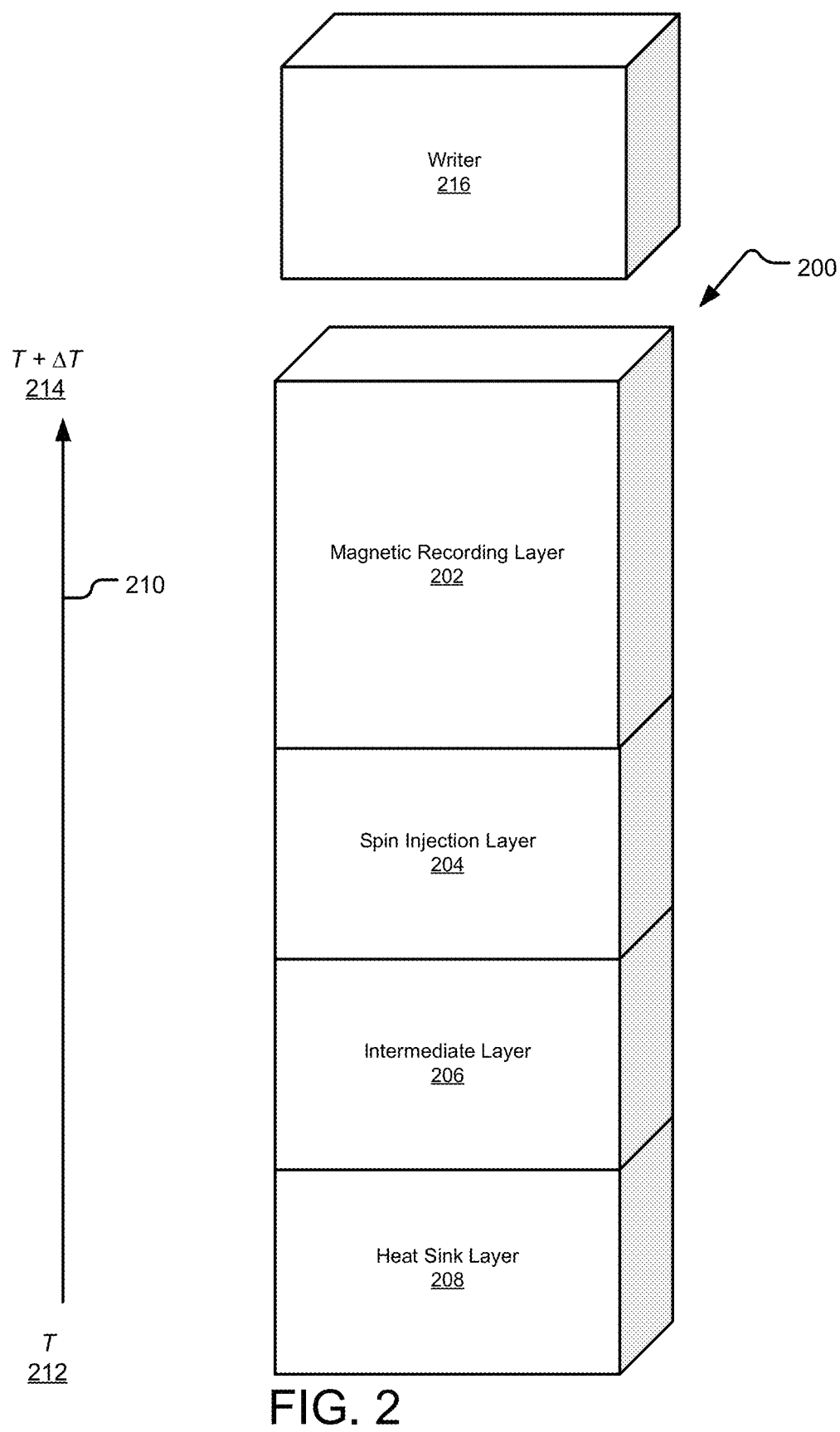
FIG. 2 illustrates an example of a layer structure of a magnetic recording media.

FIG. 2 illustrates an example of a layer structure 200 of a magnetic recording media 102. The layer structure 200 may include a magnetic recording layer 202. The magnetic recording layer 202 may be provided in a location adjacent to a thermal spin injection layer 204. The thermal spin injection layer 204 may extend relative to the magnetic recording layer 202 such that the thermal spin injection layer 204 is disposed at a different depth than the magnetic recording layer 202 but extends to be coextensive with at least a portion of the magnetic recording layer 202. An intermediate layer 206 may also be provided. A heat sink layer 208 may be located in the layer structure 200.

Also shown in FIG. 2, a thermal gradient 210 may be generated in the layer structure 200. As an example, the thermal gradient 210 may result from the operation of a near field transducer 110 that may heat the layer structure 200. For instance, a near field transducer 110 or other heat source may be provided at or near a writer pole 216. In this regard, the magnetic recording layer 202 may be nearer to the heat source than the thermal spin injection layer 204. As such, the magnetic recording layer 202 may be heated to lower the coercivity of the magnetic recording layer 202 such that thermal energy is transferred toward the thermal spin injection layer 204, intermediate layer 206, and heat sink layer 208. In turn, a thermal gradient may be established in the thermal spin injection layer 204. The thermal gradient 210 may be generated between an elevated temperature 214 (e.g., T+ΔT) and a sink temperature 212 (e.g. T). In this regard, the thermal gradient created by the near field transducer 110 may be coincident with the thermal spin injection layer 204. That is, the thermal spin injection layer 204 may be arranged in the layer structure 200 such that as the near field transducer 110 heats the magnetic recording layer 202, the thermal spin injection layer 204 is subjected to the thermal gradient 210 as the heat generated by the near field transducer 110 is dissipated through the layer structure 200

The magnetic recording layer 202 may comprise any appropriate material that may include magnetic domains capable of being manipulated for magnetic storage of data. Example materials may include iron-platinum (FePt) alloys, cobalt-platinum (CoPt) alloys, FePt superlattice, CoPt super lattice, or any of the foregoing doped with other elements. The thermal spin injection layer 204 may comprise any one or more of an antiferromagnetic material, a ferromagnetic material, or a ferrimagnetic material. In the case of antiferromagnetic materials, the thermal spin injection layer 204 may include iridium-manganese (IrMn) alloys, iridium-manganese-chromium (IrMnCr) alloys, platinum-manganese (PtMn) alloys, platinum-manganese-chromium (PtMnCr) alloys, nickel oxide (NiO), chromium (Cr), iron-manganese-platinum (FeMnPt) alloys, cobalt-manganese-platinum (CoMnPt) alloys, ion-manganese (FeMn) alloys, nickel-manganese (NiMn) alloys, palladium-manganese (PdMn) alloys, manganese-gold (MnAu) alloys, or combinations thereof. Ferromagnetic materials may include iron (Fe), cobalt (Co), nickel (Ni), iron-cobalt alloys (e.g., $Fe_xCo_{1-x}$), iron-nickel alloys (e.g., $Fe_xNi_{1-x}$), iron oxides (e.g., $Fe_2O_3$), ferromagnets containing rare earth elements, or combinations thereof. Ferrimagnets may include iron oxides (e.g., $Fe_3O_4$), Gaudium-iron-cobalt alloys (e.g., $Gd_xFe_yCo_{1-x-y}$), or other rare earth element-iron-cobalt alloys (e.g., in the form of [rare earth element]$_xFe_yCo_{1-x-y}$).

In an example, the thermal spin injection layer 204 may include an IrMn material with an antiferromagnetic configuration. The Neel temperature of the thermal spin injection layer 204 may be between about 600K and 700K. The thermal spin injection layer 204 may have a thickness of between 2 nm and 15 nm. For instance, in an example, the thermal spin injection layer 204 may have a thickness of not less than about 4 nm and not greater than about 8 nm. The intermediate layer 206 may have a thickness of between 0 nm and 5 nm.

Figure 3:
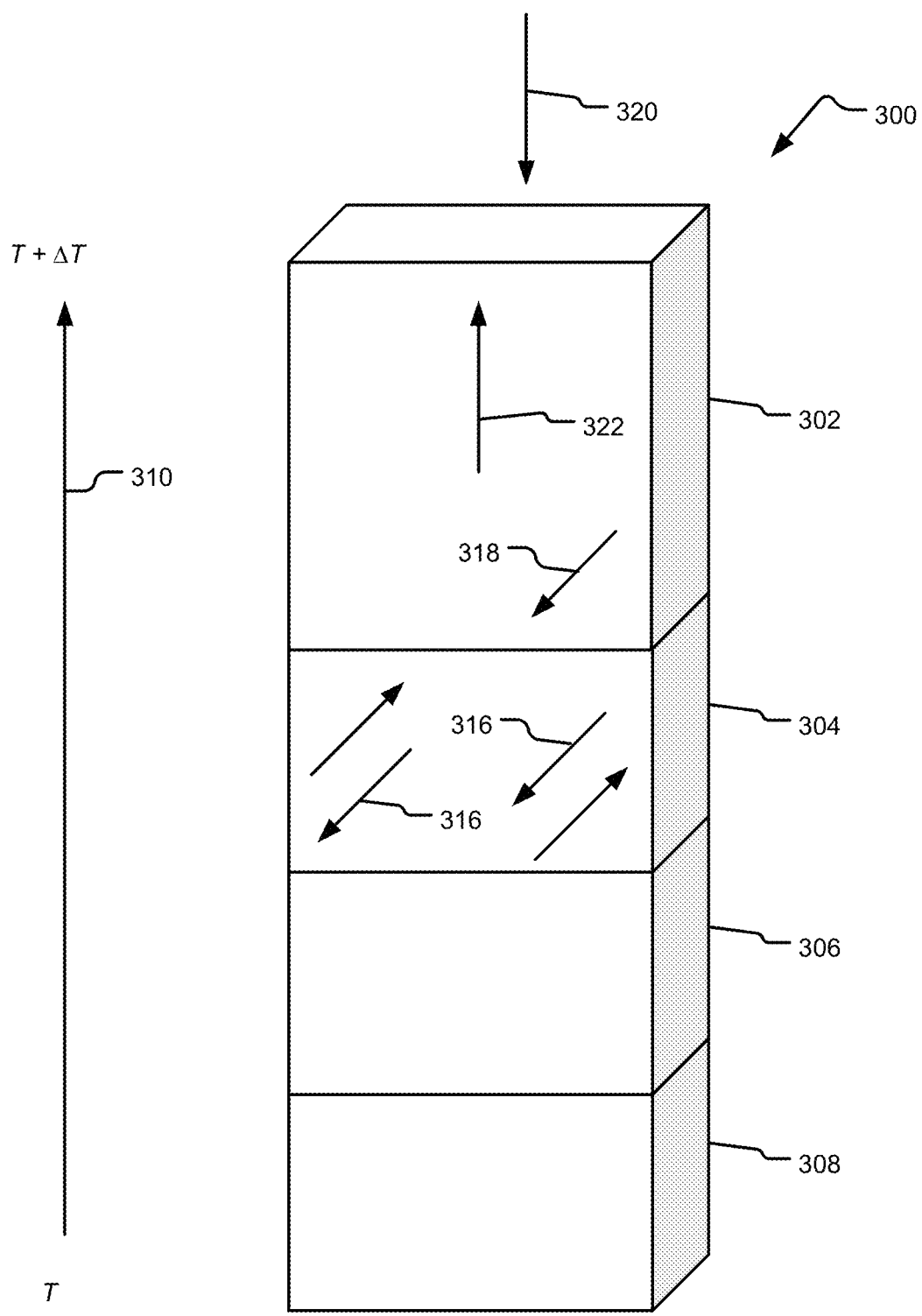
FIG. 3 illustrates an example of resulting interactions between the layers of the layer structure in response to a thermal gradient.

FIG. 3 depicts a layer structure 300 that is similar to the layer structure 200 shown in FIG. 2. Accordingly, the layer structure 300 includes a magnetic recording layer 302 located adjacent to a thermal spin injection layer 304. An intermediate layer 306 and a heat sink layer 308 may also be provided. FIG. 3 illustrates the resulting interaction between the layers of the layer structure 300 in response to a thermal gradient 310.

The thermal spin injection layer 304 may comprise a material that exhibits a Spin Seebeck Effect (SSE). The SSE relates to generation of a spin voltage in response to a thermal gradient within some magnetic materials (e.g., including ferromagnetic, antiferromagnetic, and ferrimagnetic materials). That is, an SSE material generates a spin voltage in response to a thermal gradient within the SSE material. As a result, spin currents may be generated that may inject spin into an adjacent material.

The thermal spin injection layer 304 may include an SSE material such that the thermal gradient 310 results in transfer of spins 316 from the thermal spin injection layer 304. As a result, transferring spin 318 may be injected into the magnetic recording layer 302, which may generate a magnetic field based on the transferring spin 318

Also illustrated in FIG. 3, is a writer field 320 from a writer pole (e.g., writer pole 106 or writer pole 216). A magnetization orientation 322 for a given magnetic domain of the magnetic recording layer 302 is also shown. As can be appreciated, the magnetization orientation 322 may be influenced by the writer field 320 to switch the magnetization orientation 322 of the magnetic domain, thus writing new data to the magnetic recording layer 302. The writer field 320 may also break the energy degeneracy of spin up and down in the thermal spin injection layer 304, thus making spin down the majority spins to transfer to the magnetic recording layer 302.

Figure 4:
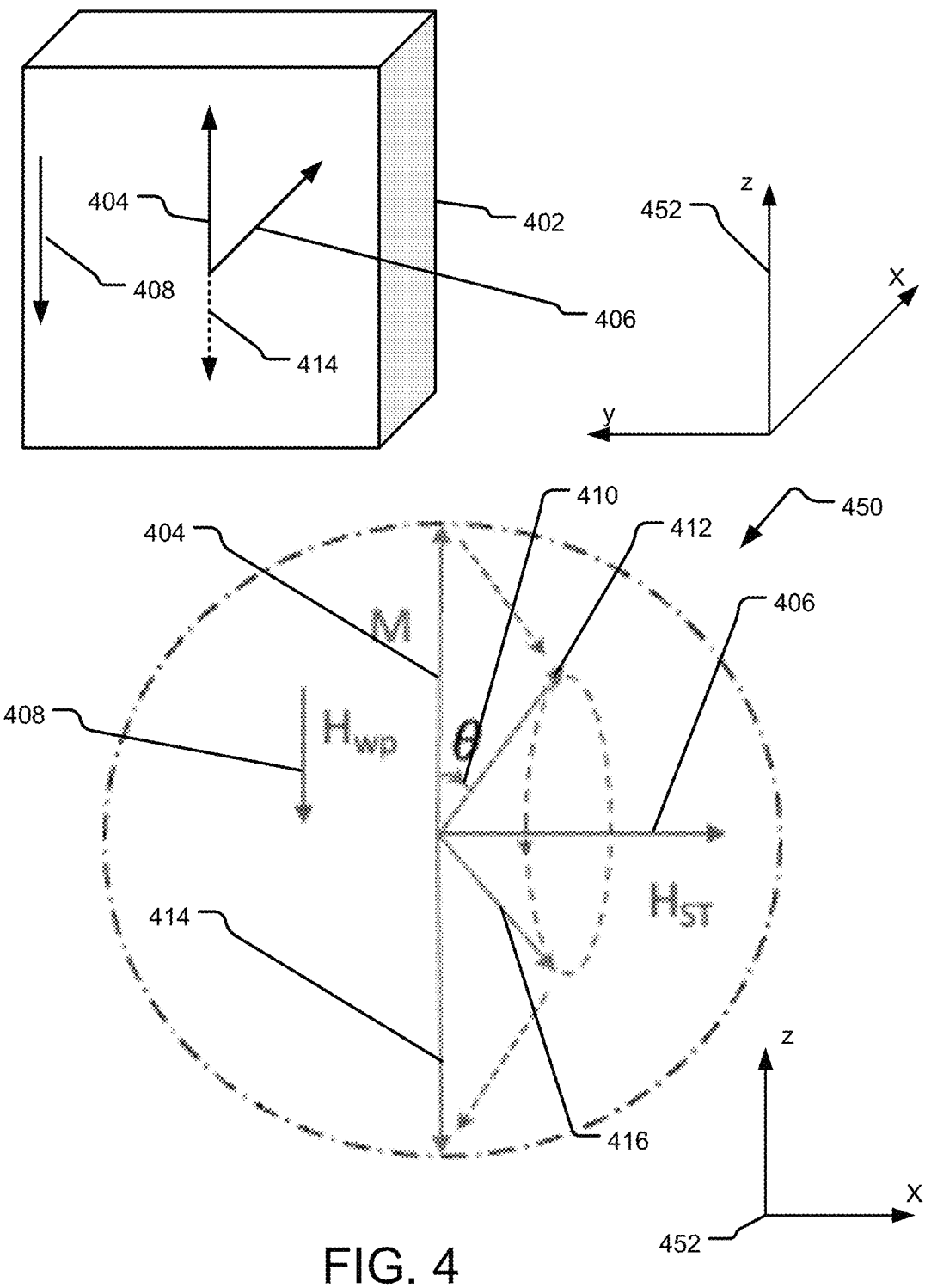
FIG. 4 shows an example of an isolated portion of a magnetic recording layer and a field diagram for the magnetic recording layer.

To further illustrate the effects of the phenomenon in FIG. 3, FIG. 4 shows an isolated portion of a magnetic recording layer 402. The magnetic recording layer 402 may correspond to the magnetic recording layer 302 in that the magnetic recording layer 402 is acted upon by a writer field 408 and an in-plane spin torque field component 406 from a spin injection layer disposed adjacent to the magnetic recording layer 402. That is, the writer field 408 may correspond to the writer field 320, and the in-plane spin torque field component 406 may result from the transferring spin 318. The spin torque field may include components that may be out-of-plane, in-plane, or have mixed components of out-of-plane and in-plane. In the field diagram 450, the in-plane spin torque field component 406 is shown, although other components of the spin torque field may also be present, although not depicted in the field diagram 450. The magnetic recording layer 402 may have an initial orientation 404 such that the magnetic orientation of the magnetic recording layer 402 (e.g., a magnetic domain of the magnetic recording layer 402) is in a positive z direction as shown in relation to the coordinate system 452. The writer field 408 may be provided to switch the initial orientation 404 into a written orientation 414.

Switching of the magnetic recording layer 402 from the initial orientation 404 to the written orientation 414 may traditionally be accomplished only under the influence of the writer field 408. While heating of the magnetic recording layer 402 to at or near the Curie temperature for the magnetic recording layer 402 may reduce the coercivity of the magnetic recording layer 402 to make the switching easier (e.g., per operation of traditional HAMR drives), it may be advantageous to provide additional energy assistance for more reliable switching and/or to lower the amount of applied heat required to switch the magnetic recording layer 402. In this regard, the in-plane spin torque field component 406 may assist in the switching process upon heating of the magnetic recording layer 402 such that a thermal gradient is created in a spin injection layer as described in FIG. 3.

To illustrate the assistance of the in-plane spin torque field component 406 in switching, FIG. 4 also illustrates a field diagram 450 that illustrates the interaction of the writer field 408 and in-plane spin torque field component 406 in relation to the initial orientation 404 and written orientation 414 during the switching (or writing) process. The orientation of the field diagram 450 relative to the coordinate system 452 is reflected by the modified depiction of the coordinate system 452 for the field diagram 450.

Upon creation of the thermal gradient in the spin injection layer, the in-plane spin torque field component 406 may act to modify the initial orientation 404 to a first intermediate orientation 412. The first intermediate orientation 412 may be at an angle 410 that reflects the influence of the in-plane spin torque field component 406 on the initial orientation 404. In this regard, in combination with the writer field 408, the in-plane spin torque field component 406 may assist in switching the initial orientation 404 by influencing the orientation of the magnetic recording layer 402 to the first intermediate orientation 412. As may be appreciated, the in-plane spin torque field component 406 may assist in switching the initial orientation 404 to the written orientation 414 through the point at which the magnetic orientation of the magnetic recording layer 402 is oriented along the positive x direction. Beyond the point at which the magnetic orientation of the magnetic recording layer 402 is oriented along the positive x direction, the in-plane spin torque field component 406 may act to counter the switching to the written orientation 414. For example, a second intermediate orientation 416 is depicted that results from the writer field 408 influencing the magnetic orientation of the magnetic recording layer 402 beyond the point at which the in-plane spin torque field component 406 assists in switching. While the in-plane spin torque field component 406 may act against switching at the second intermediate orientation 416, the writer field 408 may be maintained as the magnetic recording layer 402 cools, at which time the in-plane spin torque field component 406 may diminish with the reduction in the thermal gradient in the thermal spin injection layer. In this regard, the in-plane spin torque field component 406 may assist in initiating the switch from the initial orientation 404 to the written orientation 414 (and from the written orientation 414 to the initial orientation 404 in the event the switching operation acts to orient the magnetic domain's magnetic orientation from the written orientation 414 to the initial orientation 404).

While the in-plane spin torque field component 406 is addressed above, the injected spin to the magnetic recording layer 402 may also include an out-of-plane component. Specifically, heating the magnetic recording layer 402 (e.g., by activating the NFT) may reduce a magnetization magnitude of the magnetic domain. The thermal gradient in thermal spin injection layer induces a spin transferring torque field. However, the spin torque field orientation may be parallel to the magnetic orientation of the domain (e.g., the initial orientation 404), which does not assist in switching the magnetic orientation of the magnetic domain prior to applying the writer field 408. Upon application of the writer field 408, the writer field 408 will induce an out-of-plane component of the spin torque field to be parallel to the writer field 408 to assist switching. Furthermore, once the energy from the near field transducer is no longer applied to the magnetic domain, the magnetization magnitude recovers with temperature reduction in the written orientation 414.

Figure 5:
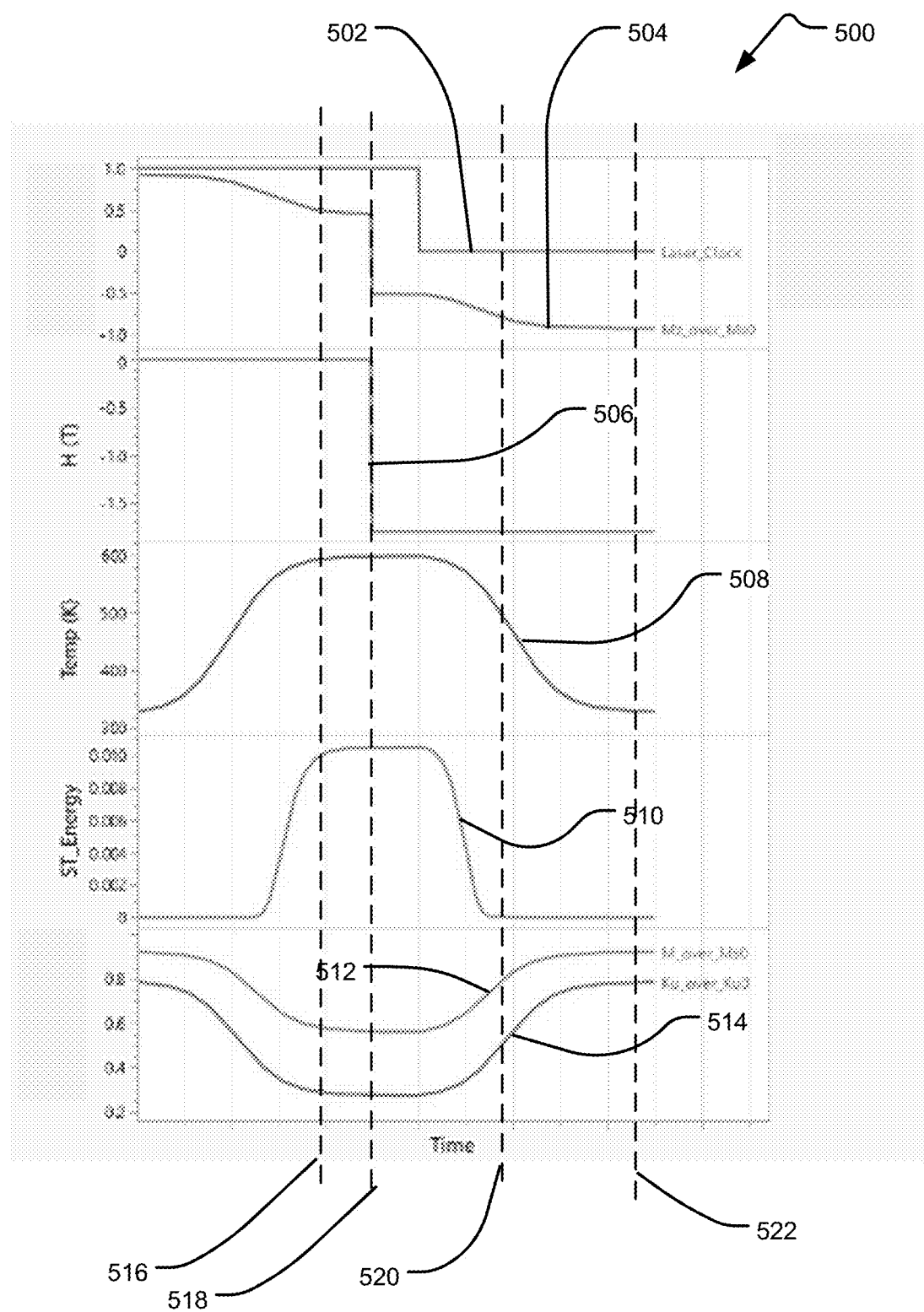
FIG. 5 presents an example illustration of the behavior of a magnetic recording layer during switching with thermal spin torque injection.

FIG. 5 presents another illustration 500 of the behavior of a magnetic recording layer during switching with thermal spin torque injection. The illustration 500 includes graphed behavior of a magnetic recording layer with respect to time, which is represented on the horizontal axis of FIG. 5. Also, a laser status 502 is illustrated with values between 1 in which the laser is active and 0 in which the laser is deactivated or moved away from the magnetic domain of interest. A magnetic recording media field orientation 504 represents the z component of a magnetization orientation of a magnetic domain in the magnetic recording layer. The magnetic recording media field orientation 504 varies between values of 1 in which the magnetic recording media field orientation 504 is in the positive z direction and −1 in which the magnetic recording media field orientation 504 is in the negative z direction. A writer field status 506 reflects the write field of a writer pole with values of 0 representing the write head being deactivated and values of −2 showing the write head producing a writer field oriented in a negative z direction.

A plot of spin torque energy 510 arising from thermal spin injection into the magnetic recording layer, a magnetization parameter 512 corresponds to the saturated magnetization of the magnetic recording layer and magnetic uniaxial anisotropy value 514 of the magnetic recording layer are also depicted at different time during switching in FIG. 5.

In addition to values plotted above, a number of time periods are reflected in FIG. 5 as vertical lines. For example, a first time period 516 may represent a prewrite period. In the first time period 516, the laser status 502 reflects that the laser is activated, while the writer field status 506 shows that the write head is not active. The temperature 508 of the magnetic recording layer has increased in response to the laser status 502. In view of the increase in the temperature 508, a temperature gradient may be established in a thermal spin injection layer such that the spin torque energy 510 has increased. The spin injection into the magnetic storage layer as a result of the spin torque energy 510 may result in the magnetic recording media field orientation 504 to begin to move away from alignment with the positive z direction as shown. This may occur even though the writer field status 506 illustrates that the writer pole has not yet been activated at the first time period 516. Furthermore, both the magnetization parameter 512 and magnetic uniaxial anisotropy value 514 are shown as being influenced by the temperature 508 in response to the laser status 502 such that the switching of the magnetic recording media field orientation 504 becomes easier. The first time period 516 illustrates the contribution to a change the magnetic recording media field orientation 504 by the spin torque energy 510 in response to a thermal gradient in a thermal spin torque layer based on the increase in temperature 508 prior to the writer field status 506 being activated.

A second time period 518 is shown that corresponds to an activation of the writer field status 506. As can be seen, a resulting change in magnetic recording media field orientation 504 is concurrent with the activation of the writer field status 506 at the second time period 518. The writer field status 506 activation may occur at a time in which the temperature 508 has reached or nears a steady state value in response to the laser status 502. As can also be appreciated, the spin torque energy 510 reaches or nears a steady state value at the second time period 518. Furthermore, the magnetization parameter 512 and magnetic uniaxial anisotropy value 514 reach or approach minimum values, thus making it less difficult to alter or switch the magnetic recording media field orientation 504.

At the second time period 518, the temperature 508 may be at or near 600 K. At this temperature 508, the in-plane spin torque field component 406 may have a field of about 2.9 T. As can be appreciated at the temperature 508 at the second time period 518, the magnetization parameter 512 is around 60% of the magnetization parameter 512 value at room temperature and the magnetic uniaxial anisotropy value 514 is around 30% of the value of the magnetic uniaxial anisotropy value 514 at room temperature. In this regard, the magnetization parameter 512 and magnetic uniaxial anisotropy value 514 may be reduced and the strength of the in-plane spin torque field component 406 may provide significant assistance in switching by moving the magnetic recording media field orientation 504 away from the initial orientation. Stated mathematically, the free energy term (E) of the system may be described as:

$$E = K_u \sin^2\theta - H_{wp}M\cos\theta - (H_{ST,in\text{-}plane}M\sin\theta + H_{ST,out\text{-}of\text{-}plane}M\cos\theta)$$

where $K_u$ is magnetic uniaxial anisotropy value 514; $H_{wp}$ the writer field 408; M is the magnetization parameter 512; $H_{ST,in\text{-}plane}$ is the in-plane spin torque field component 406; $H_{ST,out\text{-}of\text{-}plane}$ is the out-of-plane component of the spin toque field, and θ is the angle of the magnetic recording media field orientation 504 relative to the z direction. In this regard the free energy term has three component terms including an anisotropy term based on the magnetic uniaxial anisotropy value 514 ($K_u \sin^2\theta$), a writer pole term based on the writer field 408 ($H_{wp}M\cos\theta$), and a spin torque term based on the in-plane spin torque field component 406 ($H_{ST}M\sin\theta$). As can be appreciated in relation to FIG. 5, with increasing temperature, the anisotropy term and writer pole term decrease in the free energy term, whereas the spin torque term increases, thus making the spin torque term have a greater impact on the magnetic recording media field orientation 504 at higher temperature.

The value for the in-plane spin torque field component 406 may be derived according to the equations provided below:

$$\frac{\eta \hbar J}{2e\alpha_{rl}} = H_{ST}Mt_{rl}$$

where η is the spin interaction probability; $\hbar$ is a reduced Plank constant of $6.58 \times 10^{-16}$ eV; J is the average spin current density through the magnetic recording layer; e is electron charge, $\alpha_{rl}$ is the Gilbert damping for the magnetic recording layer material; $H_{ST}$ is the effective field from spin torque; M is the magnetization of the magnetic recording layer material (which is a function of temperature); and $t_{rl}$ is the thickness of the magnetic recording layer. The value of the average spin current density (J) can be expressed as:

$$J = \frac{v_S}{t_{rl}\rho_{rl}} = \frac{\Delta T S_S}{t_{rl}\rho_{rl}}$$

where $v_S$ is the thermal spin voltage from the thermal spin injection layer; $\rho_{rl}$ is the resistivity of the magnetic recording layer material; $\Delta T$ is the temperature difference across the thermal spin injection layer; and $S_S$ is the Spin Seebeck coefficient of the thermal spin injection layer. The Spin Seebeck coefficient may demonstrate a maximum at the Neel temperature of the thermal spin injection layer. By combining the foregoing equations, the effective field from the spin torque can be expressed as:

$$H_{ST} = \frac{\eta \bar{h} \Delta T S_S}{2eM\rho_{rl}\alpha_{rl}t_{rl}^2}$$

Furthermore, FIG. 5 illustrates the temperature 508 at which switching occurs may be around 600 K. This may be reduced as compared to switching temperatures of traditional HAMR drives, which may have a switching temperature of around 700 K. This reduction in temperature at which switching occurs may be attributed to the assistance that in-plane spin torque field component 406 provides in response to the thermal gradient induced.

Accordingly, with a reduction in the temperature 508 at switching, a number of performance benefits may be achieved through either reduced laser power output or more reliable switching. That is, as the magnetic recording layer may not require heating to the same temperature as in traditional HAMR drives, a laser and/or near field transducer may be operated at a lower power output to achieve increased reliability. In addition or alternatively, with the assistance of the spin torque field, switching of the magnetic domains of a magnetic recording layer may be more reliability provided.

As noted above, while the spin torque energy 510 may assist in initiating switching, once the magnetic recording media field orientation 504 passes through the 0 value representative of the magnetic recording media field orientation 504 passing past the x axis, the spin torque energy 510 may stop assisting in switching. Rather, an in-plane component of the spin torque energy 510, being oriented perpendicular to the steady state values of the magnetic recording media field orientation 504, may actually inhibit switching once the magnetic recording media field orientation 504 passes the alignment with the in-plane component of the spin torque energy 510. The out-of-plane component of the spin torque energy 510 may continue to assist in switching. At a third time period 520, the laser status 502 has been deactivated (e.g., the laser has been disabled or moved away from the magnetic domain of interest), while the writer field status 506 remains active. It may be appreciated that while not shown in FIG. 5, an out-of-plane component of spin torque field may still assist switching the magnetic domain when magnetic writer pole is on and as the magnetic domain cools. As may be appreciated, deactivation of the laser status 502 may result from deactivation of the near field transducer or may include movement of the near field transducer away from the magnetic domain represented in FIG. 5. That is, the near field transducer may remain active, but may be moved away from the magnetic domain such that the magnetic domain is no longer subjected to direct application of energy, thus resulting in the magnetic domain cooling. Thus, in response to the deactivation of the laser status 502, the temperature 508 begins to fall for the magnetic recording layer. In turn, the spin torque energy 510 also diminishes to zero or near zero. In this state, the magnetization parameter 512 and magnetic uniaxial anisotropy value 514 are recovering to normal conditions under the influence of the writer field status 506. However, with the reduction in the temperature 508, the spin torque energy 510 diminishes, thereby reducing or stopping the inhibiting of the full switching such that the influence of writer field status 506 becomes dominant or the only magnetization influence on the magnetic recording layer.

A fourth time period 522 is shown in which the temperature 508 has returned to ambient levels prior to the laser status 502 being activated. In turn, the spin torque energy 510 is diminished and the magnetization parameter 512 and magnetic uniaxial anisotropy value 514 return to ambient values. With continued influence of the writer field status 506, the magnetic recording media field orientation 504 may be fully oriented to the value of −1, which represents orientation in the negative z direction. As the magnetization parameter 512 and magnetic uniaxial anisotropy value 514 values have returned to ambient values at the fourth time period 522, the magnetic recording media field orientation 504 may be set and the data recorded in the magnetic domain may be persistently stored.

Figure 6:
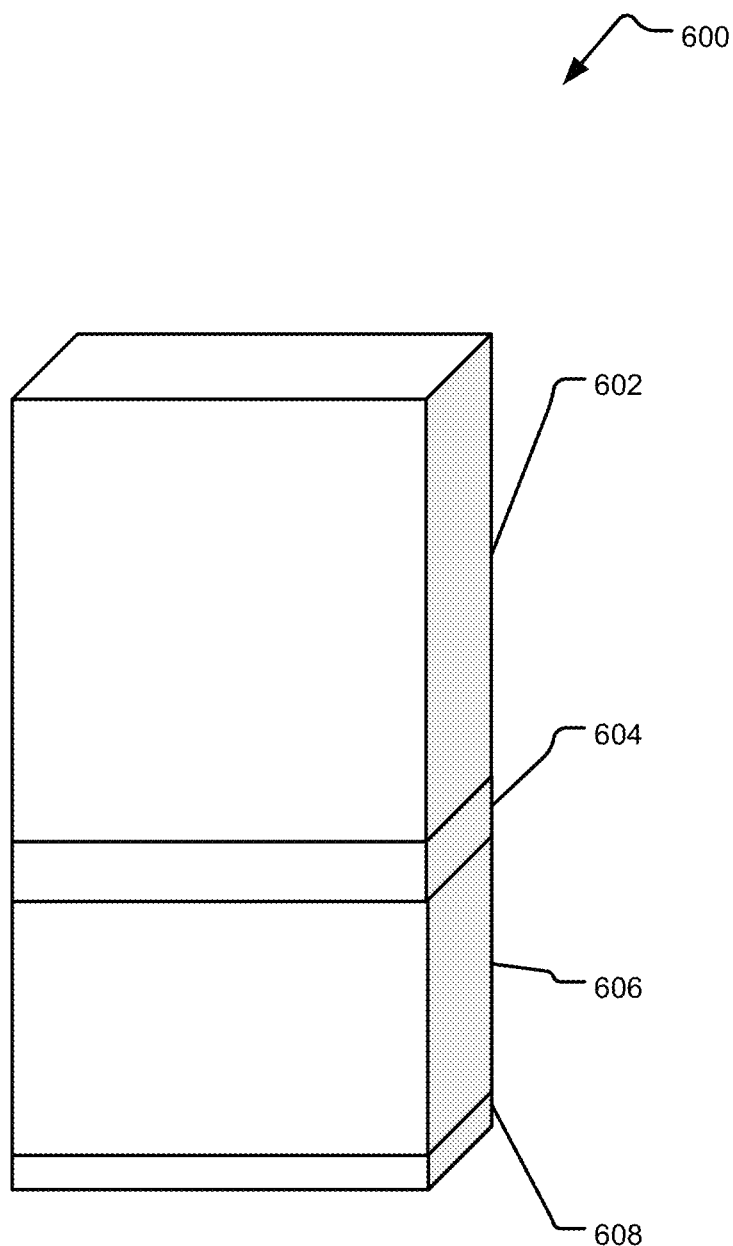
FIG. 6 illustrates an example of a partial layer structure.

FIG. 6 illustrates an example of a partial layer structure 600. The partial layer structure 600 may include a magnetic recording layer 602 and a thermal spin injection layer 606. The magnetic recording layer 602 may be separated from the thermal spin injection layer 606 by a barrier layer 604. The barrier layer 604 may assist in reducing diffusion or intermixing of materials. In this regard, the material of the barrier layer 604 may be selected to allow for reduction in diffusion of materials while reducing the impact of the barrier layer 604 on the performance of the thermally induced spin injection into the magnetic recording layer 602.

The partial layer structure 600 may include a seed layer 608 upon which the thermal spin injection layer 606, barrier layer 604, and magnetic recording layer 602 are deposited. The seed layer 608 may assist in defining or guiding structure of the thermal spin injection layer 606 and/or magnetic recording layer 602. The partial layer structure 600 may be used in conjunction with an intermediate layer and/or heat sink layer even though not depicted in FIG. 6. For example, the layer structure 200 described above may be modified to include the partial layer structure 600 having a magnetic recording layer 602, barrier layer 604, thermal spin injection layer 606, and seed layer 608 in place of the magnetic recording layer 202 and thermal spin injection layer 204 shown above in relation to FIG. 2.

The magnetic recording layer 602 in FIG. 6 may comprise any of the materials described above in relation to the magnetic recording layer 202. The thermal spin injection layer 606 may comprise any of the materials described above in relation to the thermal spin injection layer 204. Moreover, the barrier layer 604 may be an oxide, metal, or combinations thereof. For example, the barrier layer 604 may include nickel oxide (NiO), magnesium oxide (MgO), aluminum oxide ($AlO_x$), titanium oxide ($TiO_x$), cobalt oxide (CoO), aluminum (Al), copper (Cu), magnesium (Mg), or combinations thereof. The seed layer 608 may be platinum (Pt), ruthenium (Ru), copper (Cu), nickel chromium (NiCr) alloys, or combinations thereof.

Figure 7:
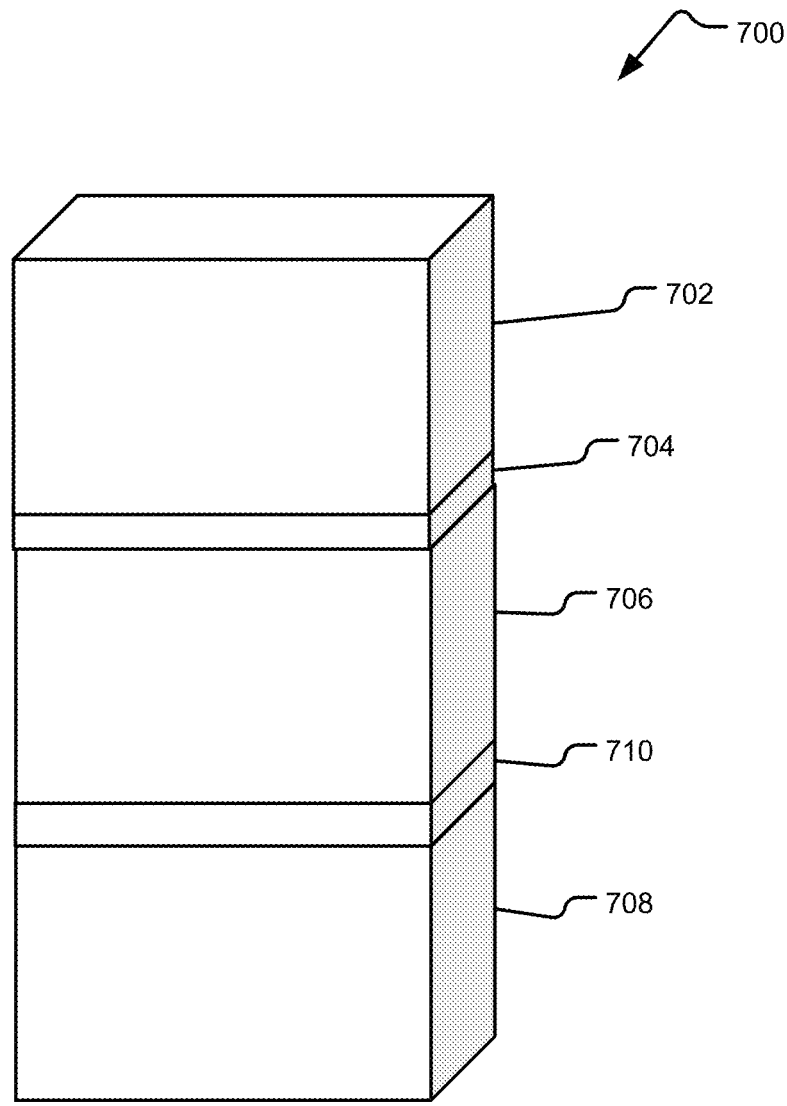
FIG. 7 illustrates another example of a layer structure.

FIG. 7 illustrates another example of a layer structure 700 that may comprise a thermal spin injection layer. Specifically, the layer structure 700 may include a first thermal spin injection layer 702, a second thermal spin injection layer 706, and a third thermal spin injection layer 708. The first thermal spin injection layer 702 may be separated from the second thermal spin injection layer 706 by a first spacer layer 704. The second thermal spin injection layer 706 may be separated from the third thermal spin injection layer 708 by a second spacer layer 710. The first spacer layer 704 and second spacer layer 710 may be diffusion layers or tunnelling barriers. In this regard, the layer structure 700 may comprise a synthetic antiferromagnetic material and/or synthetic ferrimagnetic material. For example, the first thermal spin injection layer 702, second thermal spin injection layer 706, and/or third thermal spin injection layer 708 may include any of the materials described above in relation to examples of the thermal spin injection layers. Moreover, the magnetization of the layer structure 700 may be in-plane or out-of-plane.

Figure 8:
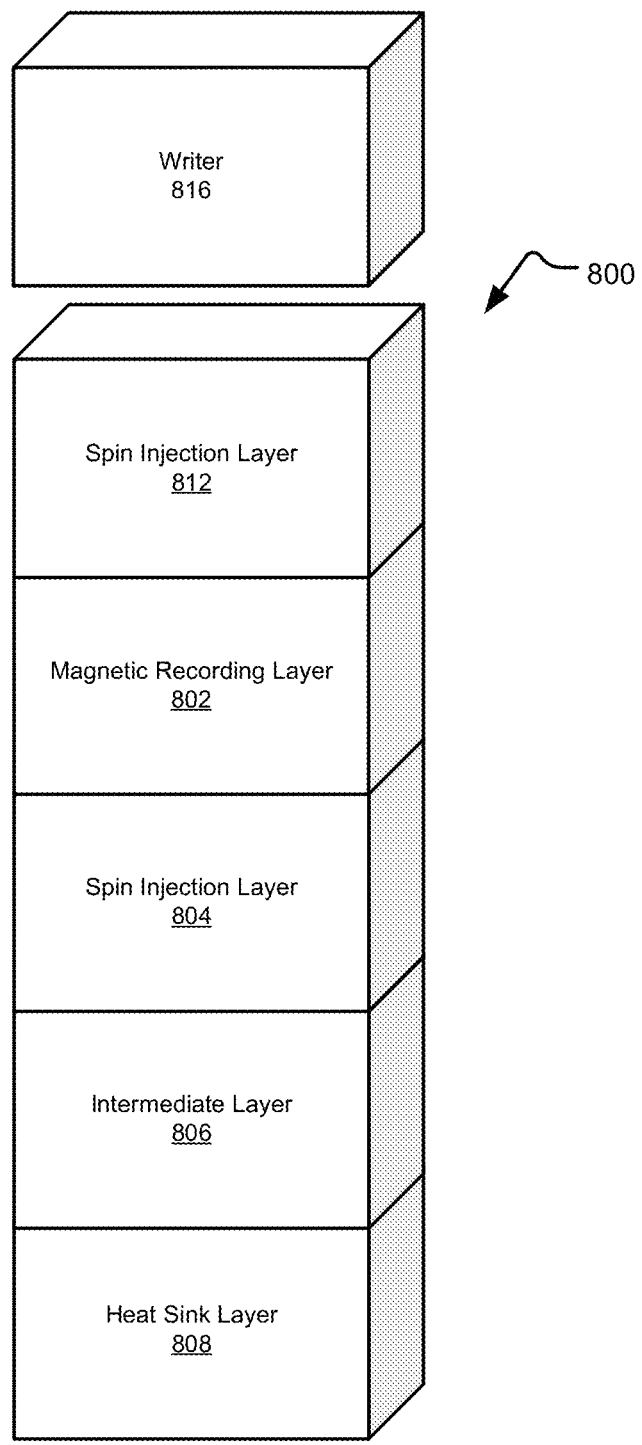
FIG. 8 illustrates an example of a magnetic recording media structure.

FIG. 8 illustrates an example of a magnetic recording media structure 800. The magnetic recording media structure 800 may include spin injection material located at one or more different relative positions to a magnetic recording layer 802. The magnetic recording media structure 800 may include an intermediate layer 806 and a heat sink layer 808. The heat sink layer 808 may be the most remote layer from a writer pole 816 of the magnetic recording media structure 800. The intermediate layer 806 may be the next to most remote layer from the writer pole 816.

The magnetic recording media structure 800 may include a thermal spin injection layer 804 that is more remote from the writer pole 816 than the magnetic recording layer 802. As can be appreciated from the foregoing, such a configuration may be according to the layer structure 200 shown in FIG. 2 and the layer structure 300 shown in FIG. 3.

Additionally or alternatively, other thermal spin injection portions or layers may be provided adjacent to the magnetic recording media structure 800 for injection of spin into the magnetic recording layer 802 in response to an induced thermal gradient. As a first example, a spin injection layer 812 may be positioned between the magnetic recording layer 802 and the writer pole 816. That is, the spin injection layer 812 may overlay at least a portion of the magnetic recording layer 802. As such, a near field transducer or the like at or on the writer pole 816 may heat the spin injection layer 812 directly such that the magnetic recording layer 802 may be heated via conduction of the thermal energy from the spin injection layer 812 toward the thermal spin injection layer 804 and/or intermediate layer 806/heat sink layer 808. The spin injection layer 812 may be provided as the only thermal spin injection layer in the magnetic recording media structure 800. Alternatively, the spin injection layer 812 may be provided in addition to the thermal spin injection layer 804.

As a further addition or alternative configuration, one or more of a thermal spin injection portions may be provided in any appropriate orientation adjacent to the magnetic recording layer 802 such that the one or more thermal spin injection portions inject spin into the magnetic recording layer 802. For instance, coplanar thermal spin injection portions may be provided to the magnetic recording layer 802. Furthermore, the one or more thermal spin injection portions may be embedded in the magnetic recording layer 802. Other physical orientations of the one or more thermal spin injection portions may be provided without limitation.

Figure 9:
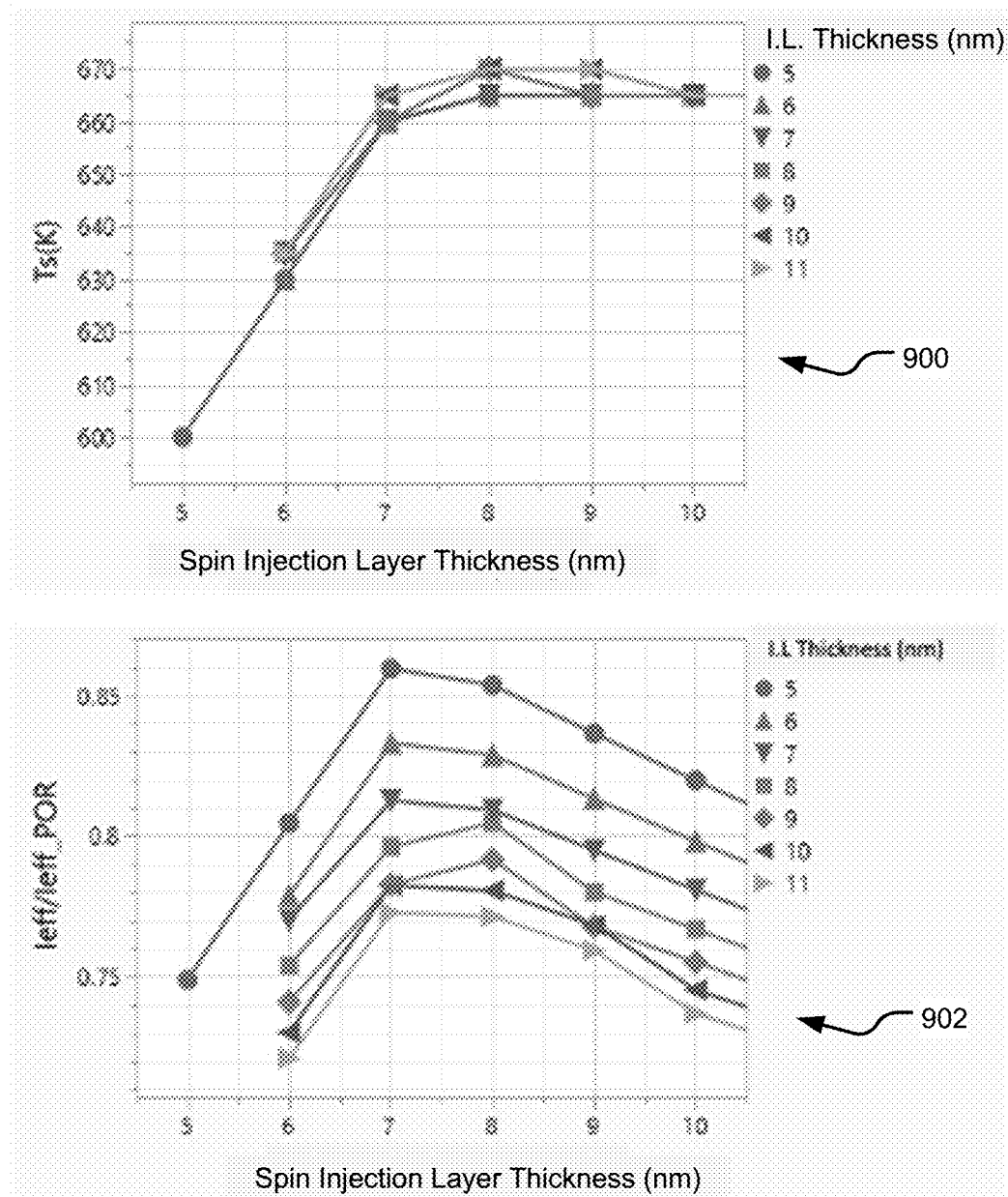
FIG. 9 illustrates example graphs of the impacts of intermediate layer thickness and thermal spin injection layer thickness on recording layer switching temperature (Ts) and laser current ($l_{eff}$) for switching of magnetic orientation of a magnetic domain.
Figure 10:
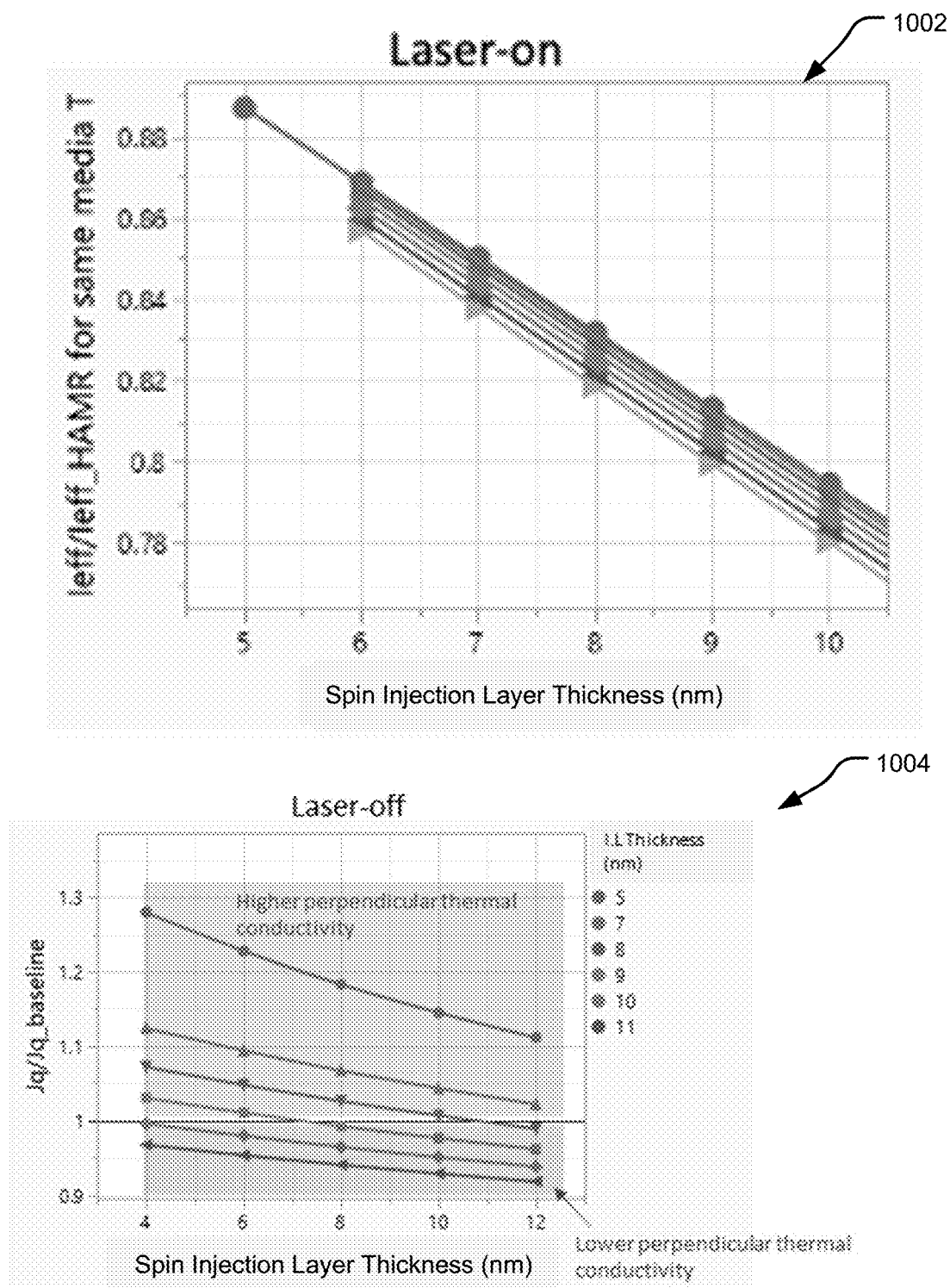
FIG. 10 includes an example plots demonstrating different perpendicular thermal conductivity properties between laser on and off states given various thicknesses of an intermediate layer and a thermal spin injection layer.

FIGS. 9-10 illustrate different example graphs that illustrate the relationship between intermediate layer thickness and thermal spin injection layer thickness in various scenarios. As will be demonstrated in the discussion of FIGS. 9-10, it may be advantageous to provide a thermal spin injection layer thickness of not less than about 4 nm and not greater than about 8 nm, although any range of thermal spin injection layer thickness of between 2 nm and 15 nm may be provided as described above. In an example, the thermal spin injection layer thickness may be about 5 nm. Moreover, it may be advantageous to minimize the intermediate layer thickness. That is, the intermediate layer thickness may not be greater than about 5 nm and may be reduced as much as possible. However, some thickness of intermediate layer thickness may be required to establish crystal orientation or other physical parameters for the thermal spin injection layer and/or magnetic recording layer.

The foregoing measurements of intermediate layer and thermal spin injection layer thicknesses may provide benefits in relation to the switching temperature of the magnetic recording layer and the thermal conductivity of the thermal spin injection layer. For example, FIG. 9 illustrates in plot 900 the relationship between the switching temperature of the magnetic recording media as represented on the vertical axis and the thermal spin injection layer thickness as represented on the horizontal axis. Specifically, curves for a number of different intermediate layer thicknesses are plotted. As can be appreciated, with increasing thermal spin injection layer thickness, the switching temperature undergoes a corresponding rise in temperature. As increasing the temperature of the recording media may require additional or increased laser power, it may be beneficial to achieve a lower switching temperature as is shown in the case of a thermal spin injection layer thickness of 5 nm and an intermediate layer thickness of 5 nm. This plot point generally corresponds to a switching temperature of around 600 K, which may be around 100 K lower than switching temperatures in traditional HAMR media (e.g., in the absence of a thermal spin injection layer).

Accordingly, plot 902 illustrates the relationship of the laser power required for switching using a layer structure including thermal spin injection layer as compared to traditional HAMR media (e.g., in the absence of a thermal spin injection layer). In this regard the vertical axis represents the ratio of laser power for switching using a thermal spin injection layer to laser power for traditional HAMR media. In this regard, a ratio of less than 1 represents an increase in efficiency in laser power utilization. Plot 902 illustrates that a thermal spin injection layer of 5 nm and an intermediate layer of 5 nm provides approximately 75% of the required laser power to provide switching in the magnetic recording media as compared to traditional HAMR media.

In addition to providing improved switching efficiency at lower temperatures, the selection of thermal spin injection layer thickness and intermediate layer thickness may be used to provide advantageous thermal conductivity characteristics as demonstrated in FIG. 10. FIG. 10 includes a first plot 1002 demonstrating a laser power efficiency ratio on the vertical axis and thermal spin injection thickness on the horizontal axis when the laser of a near field transducer is active. A second plot 1004 illustrates the thermal conductivity of a thermal spin injection layer when the laser of a near field transducer is inactive with the vertical axis representing the thermal conductivity of the thermal spin injection layer relative to a baseline HAMR media having an intermediate layer and heat sink layer in the absence of a thermal spin injection layer. The horizontal axis represents a thermal spin injection layer thickness with various plots illustrating different intermediate layer thicknesses. The value of 1 on the vertical axis represents the thermal conductivity of traditional HAMR media such that values greater than 1 provide a relative increase to thermal conductivity, and values lower than 1 represent a relative decrease in thermal conductivity relative to the baseline HAMR media.

As can be appreciated from the first plot 1002 and the second plot 1004, a 5 nm thermal spin injection layer provides at least about an 11% improvement in laser power efficiency. Furthermore, improvements of 20% or greater may also be achieved. While further improvements in laser efficiency may be achieved, this is countered by an increase of recording layer switching temperature as shown in plot 902. The higher switching temperature may reduce the switching reliability by introducing more thermal fluctuation. Furthermore, it may be advantageous to provide high thermal conductivity when the laser is inactive to provide more rapid cooling of the material. As shown, thermal conductivity is lowered with increasing thickness of the thermal spin injection layer and the intermediate layer. Accordingly, providing a thermal spin injection layer thickness and intermediate layer thickness as noted above may provide a balance between improved laser efficiency and thermal conductivity when the laser is inactive.

Figure 11:
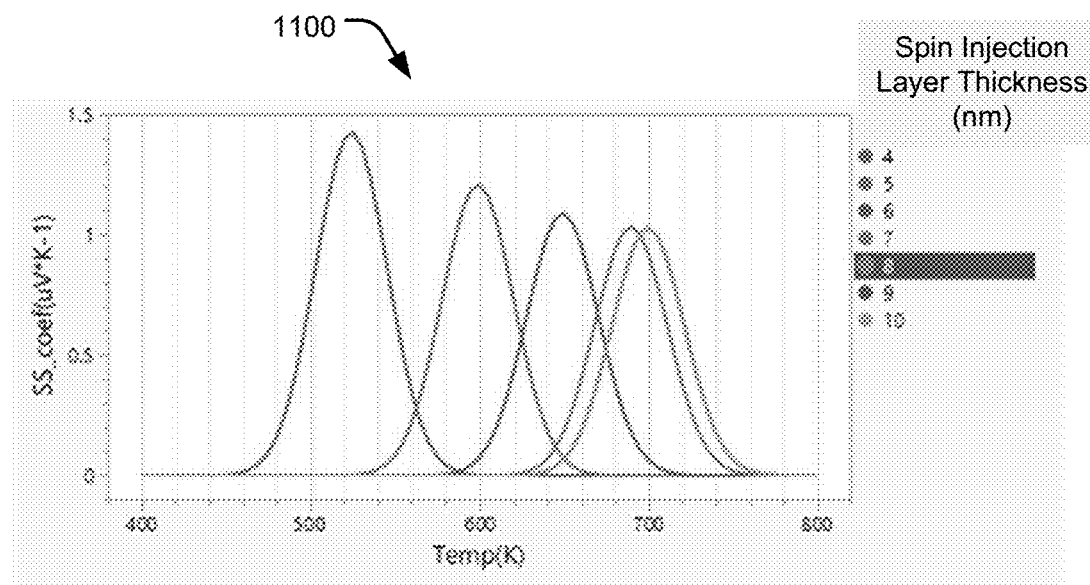
FIG. 11 illustrates an example plot that illustrates the effect of thermal spin injection layer thickness on temperature dependent Spin Seebeck coefficient.

Furthermore, FIG. 11 includes a plot 1100 that illustrates the effect of thermal spin injection layer thickness on temperature dependent Spin Seebeck coefficient. Temperature is represented along the horizontal axis, and the Spin Seebeck coefficient is represented along the vertical axis. The Spin Seebeck coefficient contributes to the spin current density injection into the magnetic recording media according to the equations provided above and shows a maximum at a Neel temperature of the thermal spin injection layer. As can be appreciated, with increased thermal spin injection layer thickness, the temperature at which the Spin Seebeck coefficient is maximized increases and the maximum value of the Spin Seebeck coefficient decreases. As such, the thinner values for the thermal spin injection layer may provide the dual advantages of greater Spin Seebeck coefficient (and in turn more spin injection) at lower temperatures. However, decreasing the thermal spin injection layer thickness may also decrease the temperature gradient, which drives thermal spin injection. As such, it may be advantageous to balance the thickness against the Neel temperature, maximum spin Seebeck coefficient, and temperature gradient of thermal spin injection layer.

Figure 12:
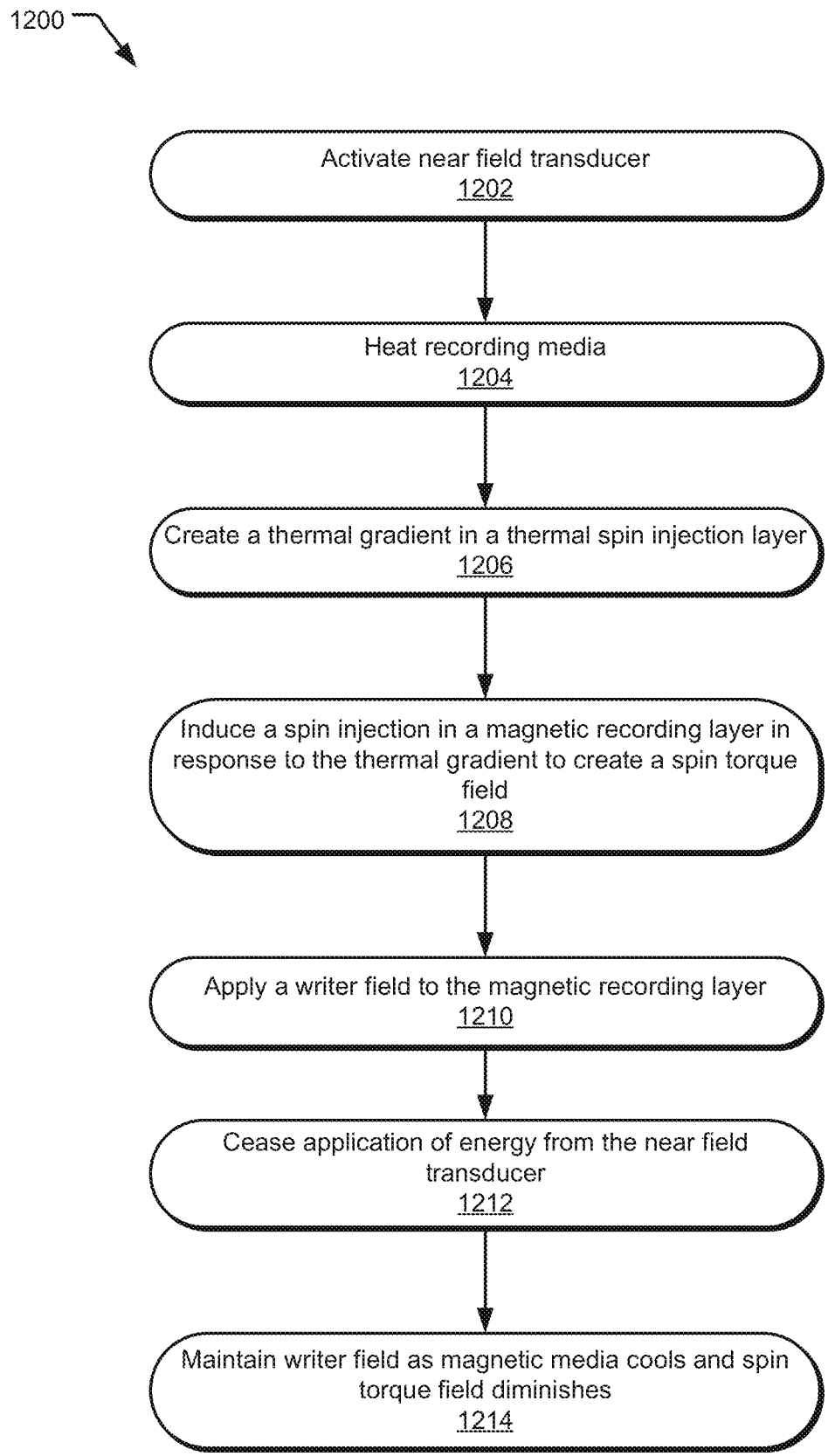
FIG. 12 illustrates example operations for operation of a storage drive to store data in a magnetic recording medium.

FIG. 12 illustrates example operations 1200 for operation of a storage drive to store data in a magnetic recording medium. The operations 1200 may include an activation operation 1202 in which a near field transducer is activated. The near field transducer may be activated by energizing a laser incident on the near field transducer. In turn, a heating operation 1204 may commence as the near field transducer acts to heat the magnetic media of the storage drive.

The operations 1200 may also include a creating operation 1206 in which a thermal gradient is created in a thermal spin injection layer. As noted above, the creating operation 1206 may include creating a thermal gradient in response to the heating operation 1204 that commences with the activation operation 1202. The thermal gradient may be created from a surface of the magnetic media on which energy from the near field transducer is applied. As described above, the thermal spin injection layer may be disposed adjacent to a magnetic recording layer such that the thermal spin injection layer may be disposed nearer to the near field transducer and/or writer pole of the storage drive than the magnetic recording layer, the thermal spin injection layer may be disposed more remote from the near field transducer and/or writer pole of the storage drive than the magnetic recording layer, the thermal spin injection layer may be disposed within a common layer (e.g., at a common depth) with respect to the near field transducer and/or writer pole of the storage drive than the magnetic recording layer, or a combination of the foregoing.

In any regard, the operations 1200 may include an inducing operation 1208 in which a spin injection is induced in the magnetic recording layer by the thermal spin injection layer in response to the creating operation 1206. The inducing operation 1208 may result in a spin torque field being applied to the magnetic recording layer. The spin torque field may act on the magnetic recording layer that has been heated in the heating operation 1204 to begin to change the orientation of at least one magnetic pole of at least one magnetic domain.

In addition, a writing operation 1210 may apply a writer field to the magnetic recording layer. The writing operation 1210 may supplement the effect of the spin torque field to further orient the magnetic pole of the magnetic domain as described above in FIG. 5. In this regard, the activation operation 1202, heating operation 1204, creating operation 1206, and inducing operation 1208 may each occur or commence prior to the writing operation 1210. In this regard, the magnetic orientation of the magnetic domain may begin to be changed in response to the spin torque field alone at least initially without the presence of the writer field that may be applied in the writing operation 1210.

The operations 1200 may also include a cessation operation 1212 in which application of energy from the near field transducer is ceased (e.g., by ceasing operation of a laser incident on the near field transducer or by movement of the location of application of energy from the near field transducer away from the magnetic domain). Upon the cessation operation 1212, the magnetic media may begin to cool, which may result in a decrease in the spin torque field as the thermal gradient in the thermal spin injection layer diminishes. In this regard, the operations 1200 may also include a maintaining operation 1214 in which the writer field applied in the writing operation 1210 is maintained as the magnetic media cools. In turn, the spin torque field, which may counteract the effect of the writer field that acts to orient the magnetic pole of the magnetic material in a direction perpendicular to the magnetic recording layer, may diminish. In turn, during the maintaining operation 1214, the predominant field acting on the magnetic domain may be the writer field of the writing operation 1210 as the magnetic media cools, thereby setting the orientation of the magnetic domain as the magnetization parameter and anisotropy value of the magnetic domain return to ambient values to provide stability in the orientation of the magnetic pole of the magnetic domain.

In some aspects, the techniques described herein relate to a magnetic recording medium, including: a magnetic recording layer for storage of data bits in magnetic domains of the magnetic recording layer; and a thermal spin injection layer disposed adjacent to the magnetic recording layer, the thermal spin injection layer includes at least one of an antiferromagnetic or ferrimagnetic material, and wherein a thermal gradient in the thermal spin injection layer induces a spin injection in the magnetic domains of the magnetic recording layer.

In some aspects, the techniques described herein relate to a magnetic recording medium, wherein the magnetic recording layer stores the data bits in the magnetic domains by aligning a magnetic orientation of the magnetic domains in a direction perpendicular to the magnetic recording layer, and wherein the spin injection in the magnetic domains creates a spin torque field to assist in switching the magnetic orientation of the magnetic domains of the magnetic recording layer.

In some aspects, the techniques described herein relate to a magnetic recording medium, wherein the magnetic recording layer is heated by a near field transducer to lower a coercivity of the magnetic recording layer and the thermal gradient in the thermal spin injection layer is coincident with a near field transducer thermal gradient created by the near field transducer.

In some aspects, the techniques described herein relate to a magnetic recording medium, further including: an intermediate layer; and a heat sink layer; wherein the thermal spin injection layer is positioned between the magnetic recording layer and the intermediate layer, and the intermediate layer is between the thermal spin injection layer and the heat sink layer.

In some aspects, the techniques described herein relate to a magnetic recording medium, wherein the thermal spin injection layer is not less than 4 nm and not greater than 15 nm.

In some aspects, the techniques described herein relate to a magnetic recording medium, wherein the thermal spin injection layer is disposed more remotely in the magnetic recording medium than the magnetic recording layer relative to a writer pole.

In some aspects, the techniques described herein relate to a storage device, including: a writer pole that is operative to induce a write head magnetic field; a near field transducer; and magnetic media, including: a magnetic recording layer for storage of data bits in magnetic domains of the magnetic recording layer, and a thermal spin injection layer extending relative to the magnetic recording layer, wherein the magnetic recording layer is disposed between the thermal spin injection layer and the writer pole, wherein the near field transducer is operative to heat the magnetic media to create a thermal gradient in the thermal spin injection layer that induces a spin injection in the magnetic domains of the magnetic recording layer.

In some aspects, the techniques described herein relate to a storage device, wherein the magnetic recording layer stores the data bits in the magnetic domains by aligning magnetic poles of the magnetic domains in a direction perpendicular to the magnetic recording layer, and wherein the spin injection in the magnetic domains creates a spin torque induced spin torque field to assist in switching the magnetic orientation of the magnetic domains of the magnetic recording layer.

In some aspects, the techniques described herein relate to a storage device, wherein the magnetic media further includes: an intermediate layer; and a heat sink layer; wherein the thermal spin injection layer is between the magnetic recording layer and the intermediate layer, and the intermediate layer is between the thermal spin injection layer and the heat sink layer.

In some aspects, the techniques described herein relate to a storage device, wherein the thermal spin injection layer includes at least one of an antiferromagnetic or ferrimagnetic material.

In some aspects, the techniques described herein relate to a storage device, wherein the thermal spin injection layer is not less than 4 nm and not greater than 15 nm.

In some aspects, the techniques described herein relate to a method of storage of data in a magnetic recording medium, including: heating a magnetic domain of a magnetic recording layer of a magnetic recording media; applying a writer field to the magnetic domain of the magnetic recording layer from a writer pole; creating a thermal gradient in a thermal spin injection layer adjacent to the magnetic recording layer in response to the heating; and inducing a spin injection in the magnetic domain of the magnetic recording layer in response to the thermal gradient created in the thermal spin injection layer, wherein the spin injection results in a spin torque field to assist the writer field in switching a magnetic orientation of the magnetic domain of the magnetic recording layer.

In some aspects, the techniques described herein relate to a method, wherein the heating includes applying energy from a near field transducer to heat a surface of the magnetic recording media.

In some aspects, the techniques described herein relate to a method, further including ceasing application of energy from the near field transducer to the magnetic domain; and maintaining the writer field to the magnetic domain after the deactivating of the near field transducer.

In some aspects, the techniques described herein relate to a method, wherein the writer field is maintained in a time period during which the magnetic domain cools and in which the spin injection diminishes.

In some aspects, the techniques described herein relate to a method, wherein the magnetic recording layer is disposed between the surface of the magnetic recording media and the thermal spin injection layer.

In some aspects, the techniques described herein relate to a method, wherein the magnetic recording layer includes at least one of an antiferromagnetic or ferrimagnetic material.

In some aspects, the techniques described herein relate to a method, wherein the heating the magnetic domain, the creating the thermal gradient, and the inducing the spin injection occur prior to the applying the writer field.

While this specification contains many specific implementation details, these should not be construed as limitations on the scope of any technologies or of what may be claimed, but rather as descriptions of features specific to particular implementations of the particular described technology. Certain features that are described in this specification in the context of separate implementations can also be implemented in combination in a single implementation. Conversely, various features that are described in the context of a single implementation can also be implemented in multiple implementations separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products.

Thus, particular implementations of the subject matter have been described. Other implementations are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

A number of implementations of the described technology have been described. Nevertheless, it will be understood that various modifications can be made without departing from the spirit and scope of the recited claims.

What is claimed is:

1. A magnetic recording medium, comprising:
   a magnetic recording layer for storage of data bits in magnetic domains of the magnetic recording layer; and
   a thermal spin injection layer disposed adjacent to the magnetic recording layer, the thermal spin injection layer comprises at least one of an antiferromagnetic or ferrimagnetic material, and wherein a thermal gradient in the thermal spin injection layer induces a spin injection in the magnetic domains of the magnetic recording layer.

2. The magnetic recording medium of claim 1, wherein the magnetic recording layer stores the data bits in the magnetic domains by aligning a magnetic orientation of the magnetic domains in a direction perpendicular to the magnetic recording layer, and wherein the spin injection in the magnetic domains creates a spin torque field to assist in switching the magnetic orientation of the magnetic domains of the magnetic recording layer.

3. The magnetic recording medium of claim 1, wherein the magnetic recording layer is heated by a near field transducer to lower a coercivity of the magnetic recording layer and the thermal gradient in the thermal spin injection layer is coincident with a near field transducer thermal gradient created by the near field transducer.

4. The magnetic recording medium of claim 1, further comprising:
   an intermediate layer; and
   a heat sink layer;
   wherein the thermal spin injection layer is positioned between the magnetic recording layer and the intermediate layer and the intermediate layer is between the thermal spin injection layer and the heat sink layer.

5. The magnetic recording medium of claim 1, wherein the thermal spin injection layer is not less than 2 nm and not greater than 15 nm.

6. The magnetic recording medium of claim 1, wherein the thermal spin injection layer is disposed more remotely in the magnetic recording medium than the magnetic recording layer relative to a writer pole.

7. A storage device, comprising:
   a writer pole that is operative to induce a write head magnetic field;
   a near field transducer; and
   magnetic media, comprising:
      a magnetic recording layer for storage of data bits in magnetic domains of the magnetic recording layer, and
      a thermal spin injection layer extending relative to the magnetic recording layer, wherein the magnetic recording layer is disposed between the thermal spin injection layer and the writer pole,
   wherein the near field transducer is operative to heat the magnetic media to create a thermal gradient in the thermal spin injection layer that induces a spin injection in the magnetic domains of the magnetic recording layer.

8. The storage device of claim 7, wherein the magnetic recording layer stores the data bits in the magnetic domains by aligning magnetic orientation of the magnetic domains in a direction perpendicular to the magnetic recording layer, and wherein the spin injection in the magnetic domains creates a spin torque induced spin torque field to assist in switching the magnetic orientation of the magnetic domains of the magnetic recording layer.

9. The storage device of claim 7, wherein the magnetic media further comprises:
   an intermediate layer; and
   a heat sink layer;
   wherein the thermal spin injection layer is between the magnetic recording layer and the intermediate layer and the intermediate layer is between the thermal spin injection layer and the heat sink layer.

10. The storage device of claim 7, wherein the thermal spin injection layer comprises at least one of an antiferromagnetic or ferrimagnetic material.

11. The storage device of claim 7, wherein the thermal spin injection layer is not less than 2 nm and not greater than 15 nm.

12. A method of storage of data in a magnetic recording medium, comprising:
   heating a magnetic domain of a magnetic recording layer of a magnetic recording media;
   applying a writer field to the magnetic domain of the magnetic recording layer from a writer pole;
   creating a thermal gradient in a thermal spin injection layer adjacent to the magnetic recording layer in response to the heating; and
   inducing a spin injection in the magnetic domain of the magnetic recording layer in response to the thermal gradient created in the thermal spin injection layer, wherein the spin injection results in a spin torque field to assist the writer field in switching a magnetic orientation of the magnetic domain of the magnetic recording layer.

13. The method of claim 12, wherein the heating comprises applying energy from a near field transducer to heat a surface of the magnetic recording media.

14. The method of claim 13, further comprising:
   ceasing application of energy from the near field transducer to the magnetic domain; and
   maintaining the writer field to the magnetic domain after the ceasing of the application of the energy from the near field transducer.

15. The method of claim 14, wherein the writer field is maintained in a time period during which the magnetic domain cools and in which the spin injection diminishes.

16. The method of claim 13, wherein the magnetic recording layer is disposed between the surface of the magnetic recording media and the thermal spin injection layer.

17. The method of claim 12, wherein the magnetic recording layer comprises at least one of an antiferromagnetic or ferrimagnetic material.

18. The method of claim 12, wherein the heating the magnetic domain, the creating the thermal gradient, and the inducing the spin injection occur prior to the applying the writer field.

* * * * *